United States Patent
Beulich

(10) Patent No.: US 12,030,109 B2
(45) Date of Patent: Jul. 9, 2024

(54) METHOD FOR CONTROLLING A BENDING PROCESS FOR BENDING A BENDING BODY

(71) Applicant: Bayerische Motoren Werke Aktiengesellschaft, Munich (DE)

(72) Inventor: Nikolas Beulich, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 359 days.

(21) Appl. No.: 17/427,979

(22) PCT Filed: Feb. 18, 2020

(86) PCT No.: PCT/EP2020/054133
§ 371 (c)(1),
(2) Date: Aug. 3, 2021

(87) PCT Pub. No.: WO2020/182422
PCT Pub. Date: Sep. 17, 2020

(65) Prior Publication Data
US 2022/0126347 A1     Apr. 28, 2022

(30) Foreign Application Priority Data

Mar. 12, 2019     (DE) ..................... 10 2019 106 181.4

(51) Int. Cl.
*B21D 7/12* (2006.01)
*B21D 7/08* (2006.01)
*G05B 19/402* (2006.01)

(52) U.S. Cl.
CPC ................. *B21D 7/12* (2013.01); *B21D 7/08* (2013.01); *G05B 19/402* (2013.01); *G05B 2219/45143* (2013.01)

(58) Field of Classification Search
CPC ... B21D 7/12; B21D 7/16; B21D 9/00; B21D 11/00; B21D 37/00; B21D 7/08; G05B 19/402; G05B 2219/45143; G05B 19/04
See application file for complete search history.

(56) References Cited

U.S. PATENT DOCUMENTS 5,111,675 A     5/1992 Murata
6,954,679 B1   10/2005 Takeda et al.
(Continued)

FOREIGN PATENT DOCUMENTS

CN     101480674 A     7/2009
CN     101952062 A     1/2011
(Continued)

OTHER PUBLICATIONS

International Search Report (PCT/ISA/210) issued in PCT Application No. PCT/EP2020/054133 dated Jun. 18, 2020 with English translation (five (5) pages).
(Continued)

*Primary Examiner* — Kidest Bahta
(74) *Attorney, Agent, or Firm* — Crowell & Moring LLP

(57) ABSTRACT

A bending process is controlled for bending a bending body, such as a bending profile. A bending device has a bending unit provided with at least one bending element that executes a defined movement based on a control signal. A data processing process is carried out in which a target geometry of the bent bending body is described in the form of target bending information by comparing at least two coordinate systems. A bending process is carried out, wherein before and/or during the bending process, the control signal controlling the at least one bending element is used on the basis of the target bending information to bend the bending body using the at least one bending element.

15 Claims, 7 Drawing Sheets

(56) References Cited

U.S. PATENT DOCUMENTS

| | | | |
|---|---|---|---|
| 2002/0157478 A1* | 10/2002 | Seale | G01N 3/00 |
| | | | 73/789 |
| 2009/0178453 A1 | 7/2009 | Ghiran et al. | |
| 2010/0117402 A1* | 5/2010 | Walter | B62D 25/2018 |
| | | | 296/203.01 |
| 2011/0094278 A1 | 4/2011 | Caporusso et al. | |
| 2012/0165609 A1* | 6/2012 | Liu | F15B 15/10 |
| | | | 600/146 |
| 2016/0288184 A1* | 10/2016 | Zhao | B21D 5/02 |

FOREIGN PATENT DOCUMENTS

| | | |
|---|---|---|
| CN | 102366770 A | 3/2012 |
| CN | 105013899 A | 11/2015 |
| CN | 105562467 A | 5/2016 |
| DE | 1 552 891 A1 | 9/1969 |
| DE | 40 15 117 A1 | 11/1990 |
| DE | 10 2009 003 950 A1 | 3/2010 |
| DE | 10 2009 024 262 A1 | 12/2010 |
| DE | 10 2014 206 622 A1 | 10/2015 |
| EP | 1 087 278 A2 | 3/2001 |
| GB | 1144269 A | 3/1969 |
| JP | 56-109118 A | 8/1981 |
| JP | 11-138217 A | 5/1999 |
| JP | 2006-239747 A | 9/2006 |
| WO | WO 2005/005071 A1 | 1/2005 |
| WO | WO 2009/101649 A2 | 8/2009 |

OTHER PUBLICATIONS

German-language Written Opinion (PCT/ISA/237) issued in PCT Application No. PCT/EP2020/054133 dated Jun. 18, 2020 (six (6) pages).

German-language Search Report issued in German Application No. 10 2019 106 181.4 dated Jan. 20, 2020 with partial English translation (12 pages).

Cover Page of EP 2 247 396 A2 published Nov. 10, 2010 (one (1) page).

English translation of Chinese Office Action issued in Chinese Application No. 202080009177.1 dated Nov. 8, 2022 (nine (9) pages).

* cited by examiner

METHOD FOR CONTROLLING A BENDING PROCESS FOR BENDING A BENDING BODY

BACKGROUND AND SUMMARY OF THE INVENTION

The present subject matter relates to a method for controlling a bending process for bending a bending body, and more specifically, a bending profile. The bending process can preferably be associated with free-form bending, wherein a bending contour or the target geometry is not influenced in a tool-bound manner, but rather by a tool kinematic, i.e., by a deliberate relative movement of at least one bending element, such as multiple bending elements movable relative to one another.

The free-form bending comprises the three-roll thrust bending, in which the bending profile is guided between a bending roll and at least one support roll and is fixed in a transport unit or a feed unit having a feed means. The profile is bent by infeed of the forming roll transversely to the profile longitudinal axis and subsequent or also simultaneous profile feed via the transport unit or via the feed means.

The present subject matter is based on the object of specifying a method which enables the control of a bending process for bending a three-dimensional bending body with respect to a simple, precise, and cost-effective measure and thus enables the production of three-dimensional bending bodies with a higher quality and a higher accuracy.

The present subject matter relates to a method for controlling a bending process for bending a bending body, and more specifically, a bending profile, wherein a bending device includes a bender provided with at least one bending element and the at least one bending element executes a defined movement on the basis of a control signal, wherein the method comprises the following method steps: (a) executing a data processing process in which a target geometry of the bent bending body is described in an item of intended bending information by comparing at least two coordinate systems and (b) executing a bending process, wherein before and/or during the bending process, the control signal controlling the at least one bending element is used on the basis of the intended bending information to bend the bending body by way of the at least one bending element. Defined and precise bending of the bending body by the bending device is achieved in this way. The bending body to be produced by the bending process of the bending device can typically comprise a three-dimensional bending body. The target geometry of the bending body can thus include a curvature of the bending body in at least one spatial axis, preferably in at least two non-coinciding spatial axes. For example, the target geometry of the bending body includes a first curvature of the bending body at a first bending point of the bending body around a first bending axis or spatial axis and a second curvature of the same bending body at a second bending point of the bending body around a second bending axis or spatial axis, wherein the first bending axis and the second bending axis do not coincide or enclose an angle not equal to 0° in their projection in a plane, in particular enclose an angle in the range of 15° to 165°. Since no standardized methods for describing 3D spatial structures for bending bodies exist in the prior art, this can be achieved in an effective and precise manner by the method mentioned herein. To achieve three-dimensional bending contours or bending lines, the bending body or the bending profile can be rotated around the longitudinal axis of the bending body in contact with at least one rotatable bending element on the bending device. In other words, a torsion or a twist of the bending body at least in sections is thus enabled. To generate a bending line or using a function of nth degree, also referred to as a spline, the at least one bending element can be moved at least in sections in at least two different movement degrees of freedom, while the feed of the bending body takes place, continuously and/or in particular at uniform speed. Alternatively, or in addition, the feed of the bending body can take place at least in sections at a variable speed.

The application of the bending method described herein is preferably applied in a method referred to as a die pressure bending method and/or pressure bending using moving die.

The bending element can be designed as a die or as a bending die, the bending element has a shape-influencing or bending effect on the bending body which it is guided past while touching the bending element during the feed. The at least one bending body acts from at least one direction, preferably from at least two directions on the bending body.

In a prior method step/process step, a data processing process, in particular a computation process, is executed, in which a target geometry of the bent bending body is described in an item of intended bending information by comparison of at least two coordinate systems. Due to the use of two coordinate systems and due to their comparison, it is made possible to describe a target geometry of the bending body precisely and convert it into an item of intended bending information. This intended bending information is configured to be usable as a control signal for the control of at least one movable bending element of a bending device. At least one of the coordinate systems used is preferably a linear, a curvilinear, a linear orthogonal, or a curvilinear orthogonal coordinate system. The type of the coordinate system can be the same, for example, for two, specifically, for all coordinate systems used within a bending process to form a bending body. For example, a spherical coordinate system is used in each case for a first and a second coordinate system to describe the target geometry of the bending body or intended bending information. The intended bending information can optionally also comprise an intended bending line to describe 3D spatial bends, so that a control signal is derivable starting therefrom, which can control the intended movement curves of at least one bending element to be moved on the bending device.

The comparison of the at least two coordinate systems compared in the data processing process, in particular in the computation process, can be carried out, for example, with respect to a translational and/or rotational displacement or change. The at least two coordinate systems can coincide at least at their respective observation time with a predefined point or region of the bending body or can represent it. By determining the difference of the coordinates representing the bending body, the spatial change or the spatial course of the bending body or the bending line can be described for the regions of the bending body assigned to the respective coordinate systems. For example, the bending body can be depicted in a first point on a center longitudinal axis of the bending body by a first coordinate system and can be depicted in a second point, which is different from the first point, on the center longitudinal axis of the bending body by the second coordinate system. The two-point observations can result through iteration, average value determination, or other mathematical methods in a continuous depiction of the bending information or the bending line for the bending body and thus for the intended bending information.

It is possible that a first coordinate system is arranged on or in a guide region, on or in a static guide section, of the bending device and a second coordinate system is arranged on or in a direction facing from the guide region in the displacement direction of the bending body in the bending device. The second coordinate system is arranged inside an action region of the at least one bending element. The guide region can form a static guide section and/or a static guide opening for a bending body which is not deformed or is not present in the target geometry and is to be bent, wherein the bending body has to pass through this static guide section and/or the guide opening, which is static in particular, of the bending body to come into contact with the bending element. The bending body can be "pushed" by a feed means or a transport means and thus transferred via the guide opening or an insertion opening into the region in which at least one bending element is arranged, which takes bending influence on the bending body by contact with it. The guide opening or the insertion opening can typically be provided as a static, i.e., fixed region of the bending device, whereby a supply, which is automated, of the bending body to be bent at or in the bending device is facilitated. In an optional embodiment, it can be provided that a guide section of the bending device forming the guide opening or the insertion opening is designed to be translationally and/or rotationally movable. In other words, a guide section which is active at least in sections as a guide for the bending body, for example, the guide element, of the bending device can be designed to be translationally and/or rotationally movable.

A second coordinate system arranged adjacent to the first coordinate system in the guide region can be arranged in the region of the at least one movable bending element. For this purpose, the second coordinate system can be arranged following in the movement direction or in the displacement direction of the bending body starting from the first coordinate system. It can thus be provided, for example, that the movement or the mobility of the bending element is depicted by a coordinate system fixed relative to the bending element. In other words, the second coordinate system can represent the bending element or at least a region of the bending element in such a way that a movement of the bending element can be depicted by a corresponding movement of the coordinate system assigned to the bending element. In the case in which the first coordinate system represents the fixed guide region or the fixed guide opening or insertion opening or is arranged there and the second coordinate system represents the movable bending element or is arranged there, therefore a first, fixed coordinate system, which is global, and a second, variable coordinate system, which is local, result.

Alternatively, or additionally, it can be provided in one example embodiment that a first coordinate system is arranged at a first action region of a first movable bending element of the bending device and a second coordinate system is arranged at a second action region of a second bending element of the bending device different from the first movable bending element. Upon movement of the first and/or second bending element, a corresponding movement occurs of the coordinate system assigned to the respective bending element. One or both bending elements can each be movably mounted as such in the bending device in this case. In that the respective coordinate systems "participate" in the respective movements of the corresponding bending elements, a precise depiction of the movement sequences of the bending elements can be achieved to form the target geometry of the bending body. The action regions of the bending elements are each to be understood as the contact surfaces of bending element and bending body, due to the interaction of which a defined deformation or bend of the bending body results.

It can prove to be expedient if the intended bending information is deliberately changed or deliberately influenced based on at least one item of boundary condition information influencing the bending process. The boundary condition information can comprise an item of material information on a material of the bending body, an item of geometry information of the bending body, and/or an item of bending device information on the bending device. The boundary condition information can deliberately change or modify the intended bending information before or during the bending process or can also be incorporated during the data processing process into the determination or generation of the intended bending information. The intended bending information which is changed or takes the boundary condition information into consideration is used as the basis of the control signal for the movement control of at least one bending element. In other words, due to the consideration of at least one item of boundary condition information in the formation of the intended bending information or due to enrichment of the intended bending information with at least one item of boundary condition information, a realistic depiction can be achieved for the control of the bending device, specifically, the at least one movable bending element of the bending device. For example, based on calculations based on the component geometry and/or the bending body properties, a first item of intended bending information can be determined or computed. This first intended bending information can experience a modification based on an item of boundary condition information, wherein the boundary condition information comprises, for example, an item of kinematic information depicting a kinematic behavior of the bending device, an item of FEM information based on an FEM simulation of the bending process, and/or an item of comparison information based on a comparison of at least one specimen component to a target geometry.

The at least one item of boundary condition information can be determined and/or acquired at least partially before or during the bending process. For example, an item of boundary condition information determined or present before the bending process can form an item of information with respect to the geometry of the bending body which has not yet passed through the provided bending process (starting geometry of the bending body to be bent) and/or with respect to the material of the bending body. These items of information can be taken, for example, from a database and provided, for example, on the part of a producer of the starting material or the semi-finished product or the bending body to be bent. Alternatively, or additionally, an item of batch information relating, for example, to a batch of bending bodies to be bent can form at least one component of an item of boundary condition information determined or acquired before the bending process by way of a manual data input, by way of a wired or wireless data transmission, and/or by way of an acquisition unit even before passing through the bending process. Alternatively, or additionally, an acquisition means, which is arranged in particular on or in the bending device, can be provided, which acquires items of information relating to the bending body and/or the bending device during the bending process and is used to form and/or influence boundary condition information. Thus, for example, at least one force acting inside the bending device can be determined via an acquisition unit designed as a force measuring unit and can be used by the bending device to deliberately influence the control signal supplied to the bending device to control at least one movable bending element. The determined force can preferably depict the force development in specific regions in this case, i.e., the force determination takes place for at least two different regions of the bending body and/or the bending device and the force information permits a corresponding region-specific statement. For example, features or characteristics specific to the bending device relating to its aging, specifically, wear, its tolerance behavior, in particular tolerances of movable components, for example, the axis parallelism and/or its position accuracy of at least one movable bending element can be taken into consideration in the formation of the control signal and thus in the control of the at least one movable bending element. These measures can result in rapid and precise control of the bending device. The acquisition unit can comprise, for example, at least one optical, haptic, and/or thermal sensor, the sensor result of which at least results in the deliberate influencing or modification of the boundary condition information. For this purpose, the acquisition unit can be designed, for example, as an optical camera, as a touch sensor, and/or as a thermal imaging camera.

The material information of the bending body can comprise at least one chemical and/or physical property, which is in particular specific to a region, of the bending body before, during, and/or after the bending process, preferably the physical property, in particular specific to a region, comprises the density, the specific heat capacity, the specific resistance, the temperature coefficient, the coefficient of thermal expansion, the normal melting point, the permeability, the index of refraction, the modulus of elasticity, and/or the shear modulus of the bending body. Such items of material information of the bending body can be used for a precise calculation of the interaction between the bending body and the bending device during the bending process. A rebound behavior of the bending body strained by bending can be predicted more precisely in particular by observing its physical properties.

The geometry information can comprise the geometric shape of the bending body before, during, and/or after the bending process, in particular the geometry information comprises at least in sections (a) a wall thickness of a bending body formed as a hollow body at least in sections, (b) a length and/or width extent of a bending body, (c) an area extent of the bending body, and/or (d) a volume extent of the bending body. The consideration of an item of geometry information for the boundary condition information can be helpful in this way for the control of the bending device and the movable bending element of the bending device, since a bending resistance torque and/or a torsion resistance torque is determinable for the bending body to be bent by way of the geometry information. A consideration of the bending resistance torque and/or the torsion resistance torque permits more accurate control of the bending device to obtain a bending body in accordance with or corresponding to the target geometry.

The bending device information can be used to consider parameters specific to the bending device, which comprises at least (a) an item of aging information relating to an aging of the bending device, (b) an item of tolerance information relating to a tolerance of at least one movable bending element of the bending device, (c) an item of temperature information relating to a temperature of the bending device, specifically, a bending element. Since the attainment of the target geometry of the bending body is not to be attributed exclusively to the quality of the bending body, but is in an interaction of the bending body with the bending device, it can be expedient if aspects specific to the bending device are taken into consideration to form an item of modified intended bending information or an item of control information controlling the bending device. For example, the bending information can comprise a parameter, which is preferably variable, of the bending device. The bending device can also be operated using alternately used, movable bending elements, so that the bending device information can specify the specific bending element provided for use for bending a defined bending body.

At least one item of boundary condition information can be stored or storable, for example, in a data storage memory, specifically, on the bending device, and can be used to form a control signal and finally can be transferred to an electronic control unit, preferably on the bending device, to form a control signal.

It can also be provided, for example, that the intended bending information is changed or modified or is changeable or modifiable by an item of correction information, wherein the correction information is formed on the basis of an item of FEM information generated or determined by a bending process simulated by a FEM process and/or on the basis of an item of deviation information generated or determined by production of a test bending component by the bending device and its comparison to the target geometry. The correction information comprising an item of FEM information and/or an item of deviation information can thus result in a possibly further change or modification of the intended bending information.

The bending device can comprise at least one bending element, which is arranged or designed movably in at least one translational and/or rotational degree of freedom, specifically, relative to a further bending element active in bending for the bending of the bending body. A freely formable bending of the bending body can be achieved by a longitudinally and/or rotationally movable mounting of the at least one bending element within the bending device. It can be provided that a first bending element is mounted rotationally and/or longitudinally movably within the device and a second bending element is placed rigidly or fixedly in or on the bending device.

It is possible that a bending device is used which comprises at least two bending elements, wherein a first bending element executes a movement along at least one first degree of freedom before or during the bending process and a second bending element executes a movement along at least one second degree of freedom, specifically, different from the first, before or during the bending process. In particular, at least one bending element can be mounted in or on the device in such a way that this bending element is movable at least in two different degrees of freedom, for example a linear and a rotational degree of freedom.

The bent bending body resulting from the method described herein can preferably be used as a vehicle component, specifically, the bending body is used as a vehicle component installed in a motor vehicle. Alternatively, the bent bending body can also be used to form other components or assemblies, for example, the bending body can form at least one component of a stair lift for wheelchair users or a component of a bent bicycle stand.

In addition to the method for controlling a bending process for bending a bending body, the present subject matter also relates to a control device for controlling at least one bending element of a bending device for bending a bending body, specifically, a bending profile, which is configured to execute a method described herein. Furthermore, the present subject matter also relates to a bending device for bending a bending body, specifically, a bending profile, which is configured to execute a method described herein. Finally, the present subject matter furthermore relates to a bending body, specifically, a motor vehicle component, which is produced in a method described herein.

The control device, which is arranged on the bending device, controls at least one bending element based on the control signal processed by it. The control signal can be generated and/or changed by an electronic control unit, which is arranged on the bending device, in consideration of at least one item of information, for example an item of boundary condition information. The control device and the electronic control unit can be arranged in a common control housing and/or in a control means which can be implemented comprising both functions.

All advantages, details, embodiments, and/or features of the method according to the present subject matter are transferable or are to be applied to the control device according to the present subject matter, the bending device according to the present subject matter, and to the bending body according to the present subject matter.

DETAILED DESCRIPTION OF THE DRAWINGS

Figure 1:
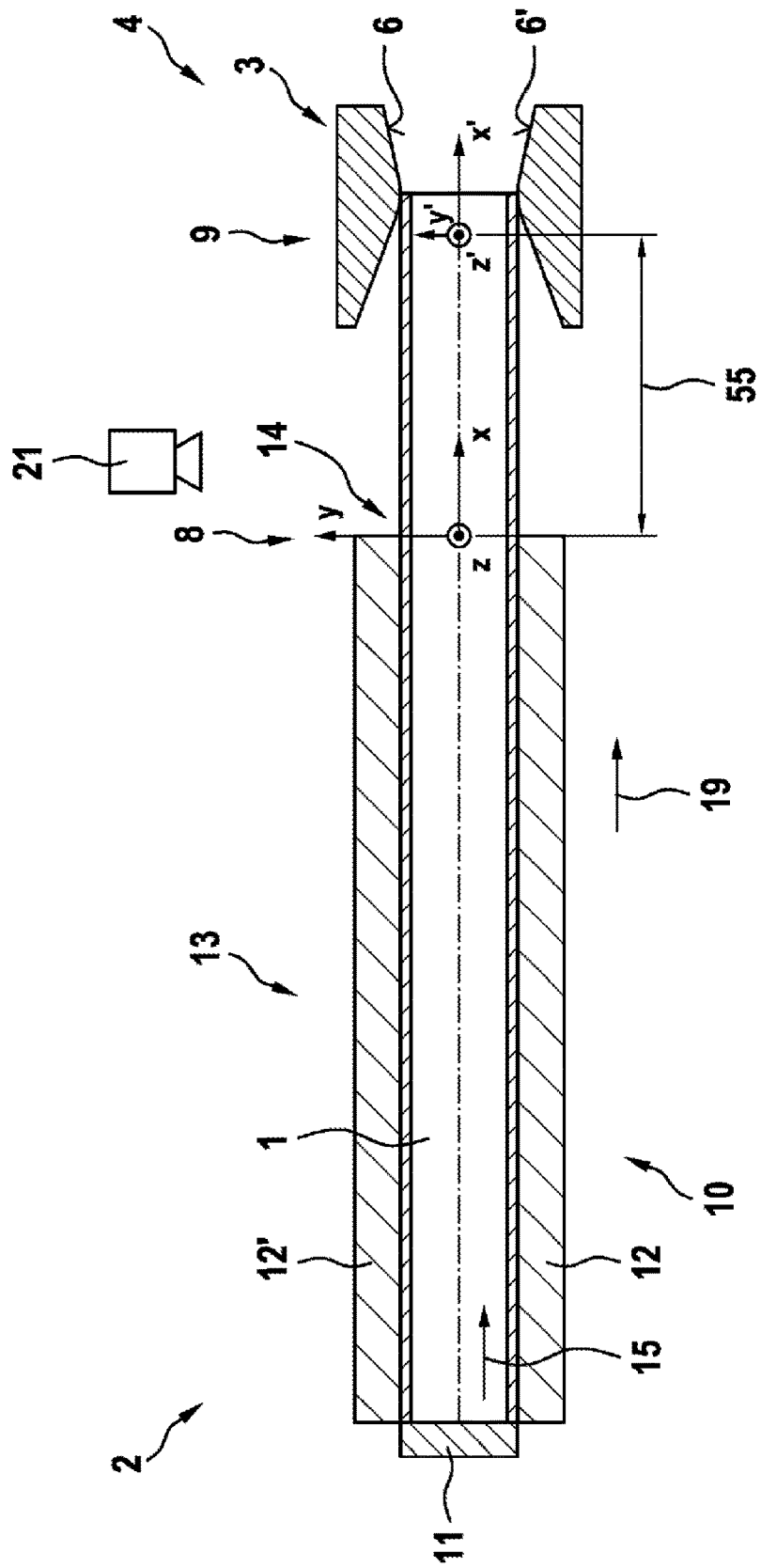
FIG. 1 shows a schematic illustration of a bending device according to one example embodiment.
Figure 2:
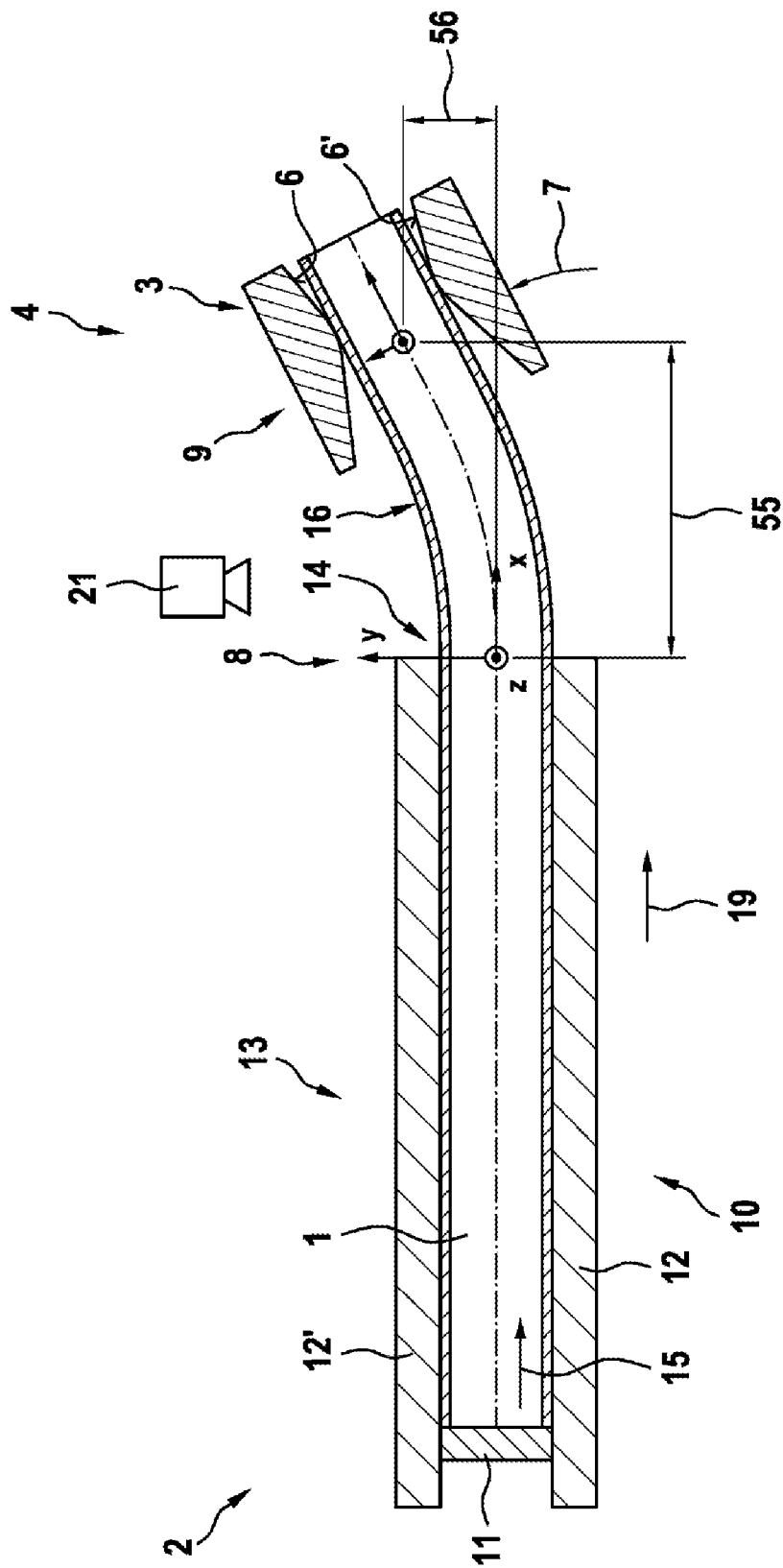
FIG. 2 shows a schematic illustration of a bending device according to FIG. 1 in an advanced bending process time.

FIG. 1 shows a schematic illustration of a bending device 2 to illustrate a method for controlling a bending process for bending a bending body 1, specifically, a bending profile, wherein the bending device 2 includes a bender 4 provided with at least one bending element 3 and the at least one bending element 3 executes a defined movement on the basis of a control signal 5. In FIGS. 1 and 2, the movement of the bending element 3, consisting of planar sections 6, 6', specifically, two opposing planar sections, is shown as a component of a translational movement in the y direction and as a component of a rotational movement around the z or z' axis and is illustrated by the arrow 7. In other words, the second coordinate system 9 includes in comparison to the first coordinate system 8 a distance 55 in the x direction, a distance 56 in the y direction, and also a pivot around the z axis. The bending device 2 operates in such a way that a preferably initially linear bending body 1 is provided or introduced into a guide region 10 of the bending device 2, which extends linearly and includes at least two guide elements 12, 12'. The guide region 10 is designed in the illustrated embodiment as a static, i.e., fixed guide section 13 of the bending device 2 and comprises two static or fixed guide elements 12, 12'. The end of the guide elements 12, 12' facing toward the at least one bending element 3 forms a guide opening 14 or an insertion opening, which forms a beginning of a route along which a deformation or a bend of the bending body to be bent is initiated by means of the at least one bending element 3. Via the feed movement (cf. arrow 15) of a feed means 11, the bending body 1 to be bent is moved toward the bending element 3. A guide taking place at least at two locations of the bending body 1 is achieved by a contact of the bending element 3 with the bending body 1 guided at least at the guide opening 14, so that by deliberate relative displacement of the guiding means in relation to one another, an effect resulting in a bending strain on the bending body 1 to be bent is achievable. In other words, by pressing the feed means 11 on the end of the bending body 1 opposite to the bending element 3, the bending body 1 is forced into a guide contour formed by the planar sections 6, 6' of the bending element 3. The guide contour of the bending element 3 and the guide opening 14 define a guide channel, which is defined at least by its starting point and end point. After the bending body 1 has passed through this guide channel, the bending body 1 has at least one bent section 16. In FIG. 1, the guide channel formed by the guide opening 14 and the bending element 3 is formed linear or the guide opening 14 and the bending element 3 are aligned coaxially to one another. In this position, no bending of the bending body 1 is achieved. Bending of the bending body 1 by the bending device 2 can only be executed by the displacement of the bending element 3 relative to the guide opening 14 out of this base position shown in FIG. 1.

For the application of the method described herein, two coordinate systems 8, 9 are used. For example, according to FIG. 1, a first coordinate system 8 can be arranged on or in the guide opening 14 and a second coordinate system 9 can be arranged on or in the bending element 3. The second coordinate system 9 is preferably arranged in the center of the bending element 3 or in the center of the region forming the guide channel section on the bending element side.

Figure 3:
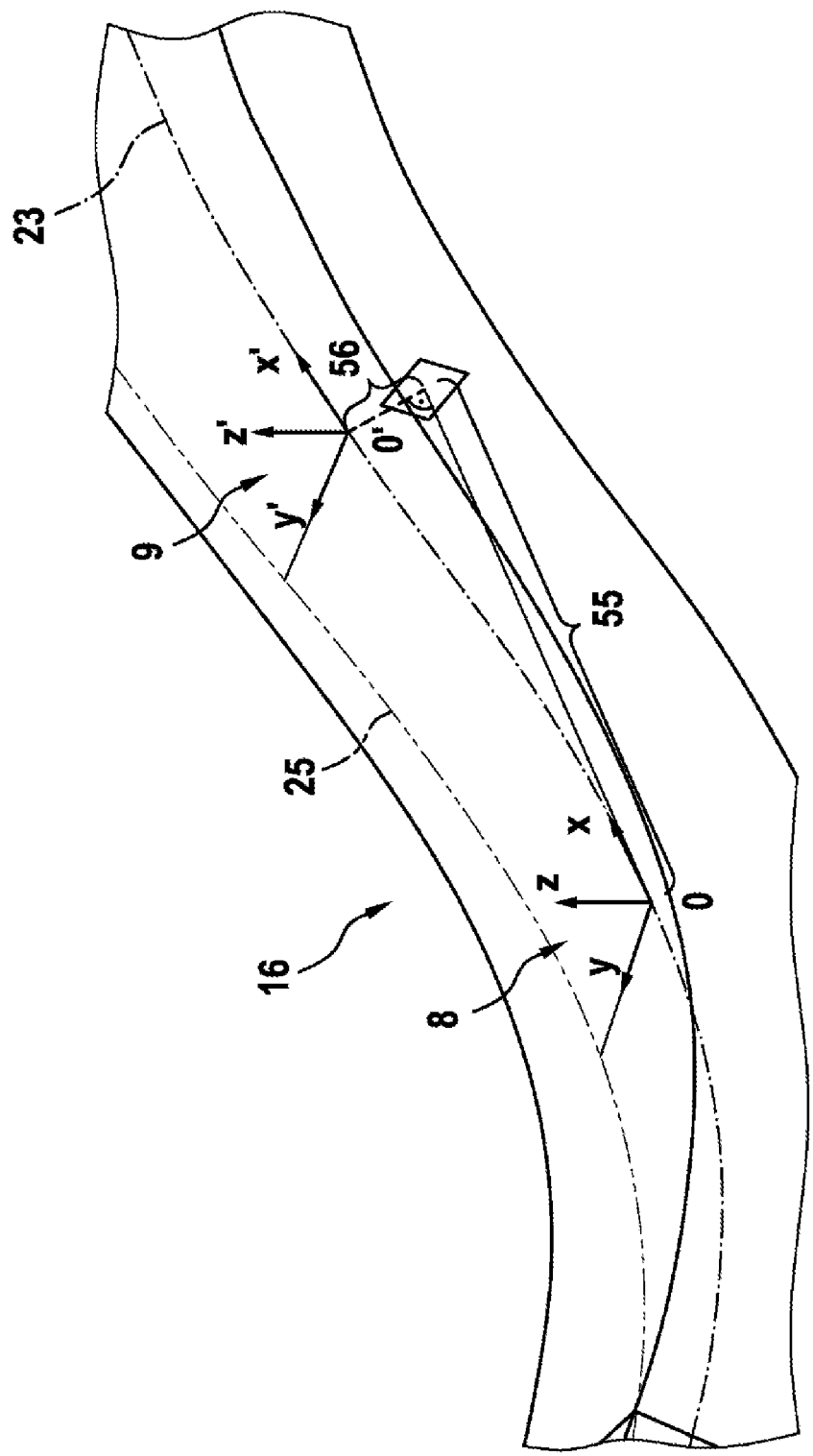
FIG. 3 shows a perspective schematic illustration of an item of intended bending information according to one example embodiment.

FIG. 3 shows a bent section 16, wherein the two coordinate systems 8, 9 to be compared to one another include a pivot or twist around the bending line 23. In other words, a torsional strain of the bending body 1 takes place. In order to describe this precisely in the intended bending information, in addition a support curve 25 can be used, which extends, for example, on or at a surface region of the bending body 1, in the illustrated embodiment according to FIG. 3 the bending body 1 has a rectangular cross-sectional shape, wherein the support curve 25 extends in the middle or at half height of the short rectangle side shown on the left in the drawing. By observing the course of the support curve 25 relative to the bending line 23, a pivot of the bending body 1 along its center longitudinal axis or the bending line 23 can be described in a simple manner.

Figure 4A:
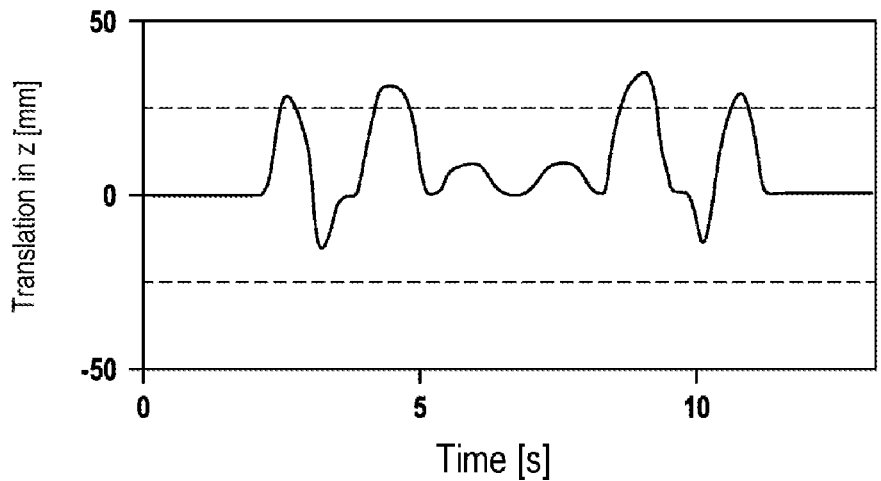
FIGS. 4a, 4b show a schematic illustration of a control signal for a first (FIG. 4a) and for a second (FIG. 4b) movement degree of freedom of a bending element according to one example embodiment.
Figure 4B:
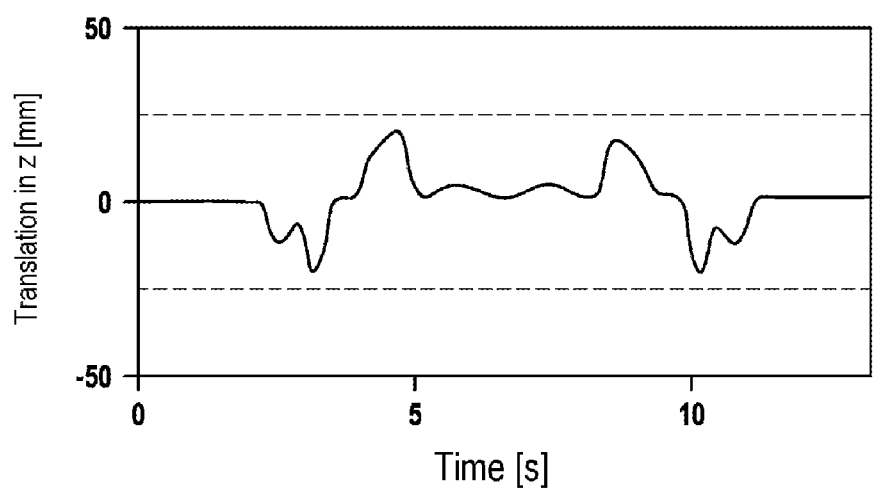

In a first method step, a data processing process 17 is executed, wherein an item of intended bending information 18 describing a target geometry of the bent bending body 1 is generated by this process via a comparison of two coordinate systems 8, 9. In a subsequent method step, a bending process is executed, wherein a control signal 5 controlling the at least one bending element 3 on the basis of the intended bending information 18 is used before and/or during the bending process, in order to bend the bending body 1 by way of the at least one bending element 3. The control signal 5 controls the at least one bending element 3 in such a way that it executes a defined movement, relative to a guide opening 14. For example, a part of a control signal 5 for controlling a bending element 3 is shown in each of FIGS. 4a and 4b, wherein as a function of the time and thus as a function of the defined feed of the bending body 1 by the feed means 11, the movement of the bending element 3 is shown in the translational movements along the Z axis (FIG. 4a) and along the Y axis (FIG. 4b). Analogously thereto, a control signal 5 of the bending element 3 for a rotational movement can comprise an analogous item of rotational angle information dependent on the time.

The comparison of the at least two coordinate systems 8, 9 compared in the data processing process 17, in particular in the computation process, takes place in particular with respect to a translational and/or rotational displacement or change. In other words, the difference of the two coordinate systems 8, 9 is compared with respect to a translational and/or rotational change. The items of information resulting from the comparison are used to describe the intended bending information 18 or to generate the control signal 5 based on the foundation of the intended bending information 18.

According to FIGS. 1 and 2, it can be provided that a first coordinate system 8 is arranged at a guide region 10, in particular at a static guide section 13, of the bending device 2, and a second coordinate system 9 is arranged at a direction facing from the guide region 10 in the displacement direction (cf. arrow 19) of the bending body 1 to at least one bending element 3. In this case, for example, the second coordinate system 9 can be arranged or formed inside an action region (for example the planar sections 6, 6') of the at least one bending element 3, i.e., the second coordinate system 9 is arranged close to or in or on the contact region of the bending element 3 with the bending body 1.

Alternatively or additionally, a first coordinate system 8 can be arranged at a first action region of a first movable bending element 3 of the bending device 2 and a second coordinate system 9 can be arranged at a second action region of a second bending element (not shown), which is different from the first movable bending element 3, of the bending device 2, in particular upon movement of the first and/or second bending element 3, a corresponding movement of the coordinate system 8, 9 assigned to the respective bending element 3 takes place.

Figure 5:
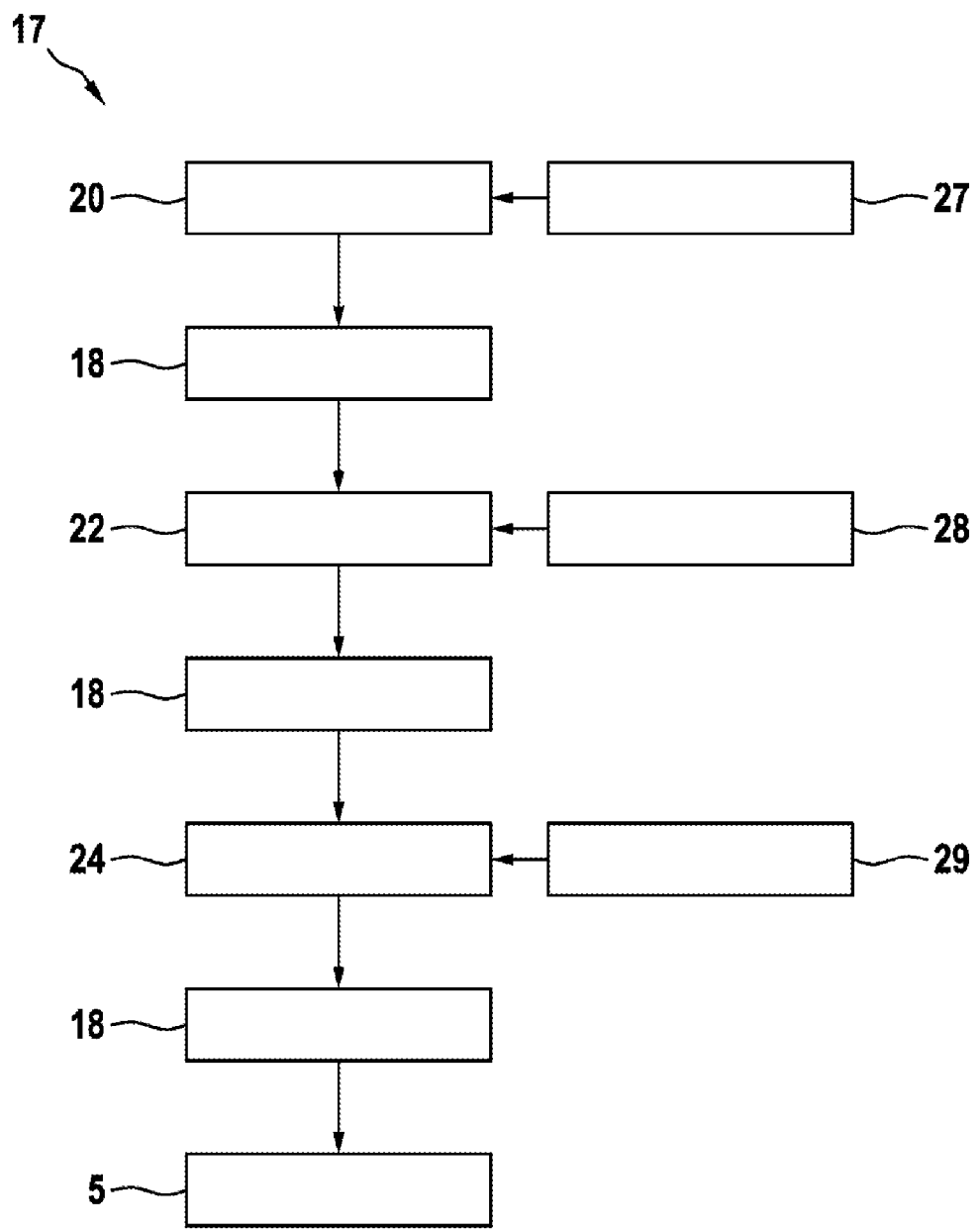
FIG. 5 shows a schematic illustration of a time sequence of a generation or modification of an item of intended bending information generation and of the control signal derived therefrom according to one example embodiment.

According to the data processing process shown in FIG. 5, it can be provided, for example, that first in a first process step 20, a computation of the intended bending information 18 is carried out by comparing at least two coordinate systems 8, 9. In addition, at least one item of boundary condition information can be taken into consideration in the first process step 20, which results in a deliberate change or modification of the intended bending information 18 still within the first process step 20. For example, an item of material information on a material of the bending body 1, an item of geometry information of the bending body 1, and/or an item of bending device information on the bending device 2 can be used as the boundary condition information.

The boundary condition information can be determined and/or acquired at least partially before or during the bending process, in particular at least one item of boundary condition information is at least partially acquired by an acquisition means 21 arranged on the bending device.

The material information of the bending body 1 can comprise at least one chemical and/or physical property, which is specific to a region in particular, of the bending body 1 before, during, and/or after the bending process, preferably the physical property comprises, in particular specifically to a region, the density, the specific heat capacity, the specific resistance, the temperature coefficient, the coefficient of thermal expansion, the normal melting point, the permeability, the index of refraction, the modulus of elasticity, and/or the shear modulus of the bending body 1. The geometry information can comprise, for example, the geometrical shape of the bending body 1 before, during, and/or after the bending process, in particular the geometry information comprises at least in sections (a) a wall thickness of a bending body 1 formed at least in sections as a hollow body, (b) a length and/or width extent of a bending body 1, (c) an area extent of a bending body 1, and/or (d) a volume extent of a bending body 1.

The bending device information on the bending device 2 can comprise, for example, at least (a) an item of aging information relating to an aging of the bending device 2, (b) an item of tolerance information relating to a tolerance of at least one movable bending element 3 of the bending device 2, and/or (c) an item of temperature information relating to a temperature of the bending device 2, in particular a bending element 3.

The boundary condition information can preferably be stored or storable in a data storage memory (not shown) and transmitted via a wired or wireless data connection to an electronic control unit (not shown) for generating a control signal 5.

It can be provided, for example, that the intended bending information 18 is changed or modified by an item of correction information, wherein the correction information is formed (a) on the basis of an item of FEM information generated or determined by a bending process simulated by a FEM process and/or (b) on the basis of an item of deviation information generated or determined by production of a test bending component by the bending device 2 and a comparison of the test bending component to the target geometry. This change or modification of the intended bending information can take place, for example, within the first process step 20.

According to FIG. 5, it can be provided that at different times during a bending method for bending a bending body, a generation or a modification of an item of intended bending information 18 is executed. For example, in a first process step 20 for the respective bending body 1, standardized items of information 27 can be used to form the intended bending information 18 and to form the control signal 5. Primarily typical value ranges are used for this purpose for the intended bending information 18, which can be based on items of information which were derived from a specimen or test bending process, from a FEM process, from an item of general material information of the bending body 1, and/or from the general or typical geometry information on the bending body to be bent, can be used for a plurality of bending processes, and can therefore also be referred to as standardized information 27. To take into consideration more accurately, for example, batch-specific or preprocessing-specific variations in the properties of the bending body 1 influencing the bending behavior of the bending body 1, an item of intended bending information 18 based on standardized items of information 27 can be modified. For this purpose, an item of batch information 28 can be used, in which, for example, batch-specific material characteristic values and/or geometry values of the bending body 1 to be bent can be incorporated after the change of the batch of the bending body 1 to be bent during a second process step 22. In other words, in a second process step 22, an item of batch-specific or series-specific information 28 can be incorporated in the formation of the intended bending information 18 and thus in the formation of the control signal 5. For example, a batch or a series relates to a group of bending bodies 1 to be bent which were created in an identical or equivalent manufacturing process. In a further advantageous embodiment, it is provided that information determined in the course of a further, in particular third process step 24 shortly before the bending process or during the bending process, referred to here as online information 29, is taken into consideration for the modification of the intended bending information 18 or the control signal 5. Thus, for example, the material thickness of the bending body 1 can be optically acquired via the acquisition means 21 and this specific information relating to the bending body 1 presently to be bent can be used for "fine adjustment" or for online modification of bending process parameters or the control signal 5. For example, for this modification of the intended bending information 18 taking place shortly before the bending process or during the bending process, at least one of the following items of information can be taken into consideration: (a) curvature course in a preforming zone, i.e., between two bending-active regions of the bending device 2, (b) force at a bending element 3, (c) force at the feed means 11, (d) retention force on a bending element 3, in particular on a bending mandrel. Due to this acquisition and modification, which takes place, for example, in real time or online during the bending process for a bending body 1, of the intended bending information 18 or control signal 5 used for the bending of this bending body 1, the target geometry of the respective bending body 1 to be bent can be achieved more accurately. For example, by way of an online comparison of an actual force applied to the feed means 11 to an intended force, in the case of a deviation, a readjustment of the movement control of the controlled bending element 3 can take place in such a way that at least partial regions of the bending body 1 to be bent are influenced in their bending executed by the bending device 2.

It can also be provided that the bending element 3 is designed in such a way that it is arranged or designed movably in at least one translational and/or rotational degree of freedom, relative to a further bending element (not shown) active in bending for the bending body 1. A bending device 2 can be used which comprises at least two bending elements 3, and a first bending element 3 executes a movement along at least one first degree of freedom before or during the bending process and a second bending element 3 executes a movement along at least one second degree of freedom, different from the first, before or during the bending process. Because multiple bending elements 3 each separately controllable in their movement are provided, a bending process which is faster and/or manages with less mechanical load for the individual bending element 3 can be represented using the bending elements 3.

The bending body 1 can be used according to its intended bending or deformation as a vehicle component, such as a motor vehicle component.

Figure 6:
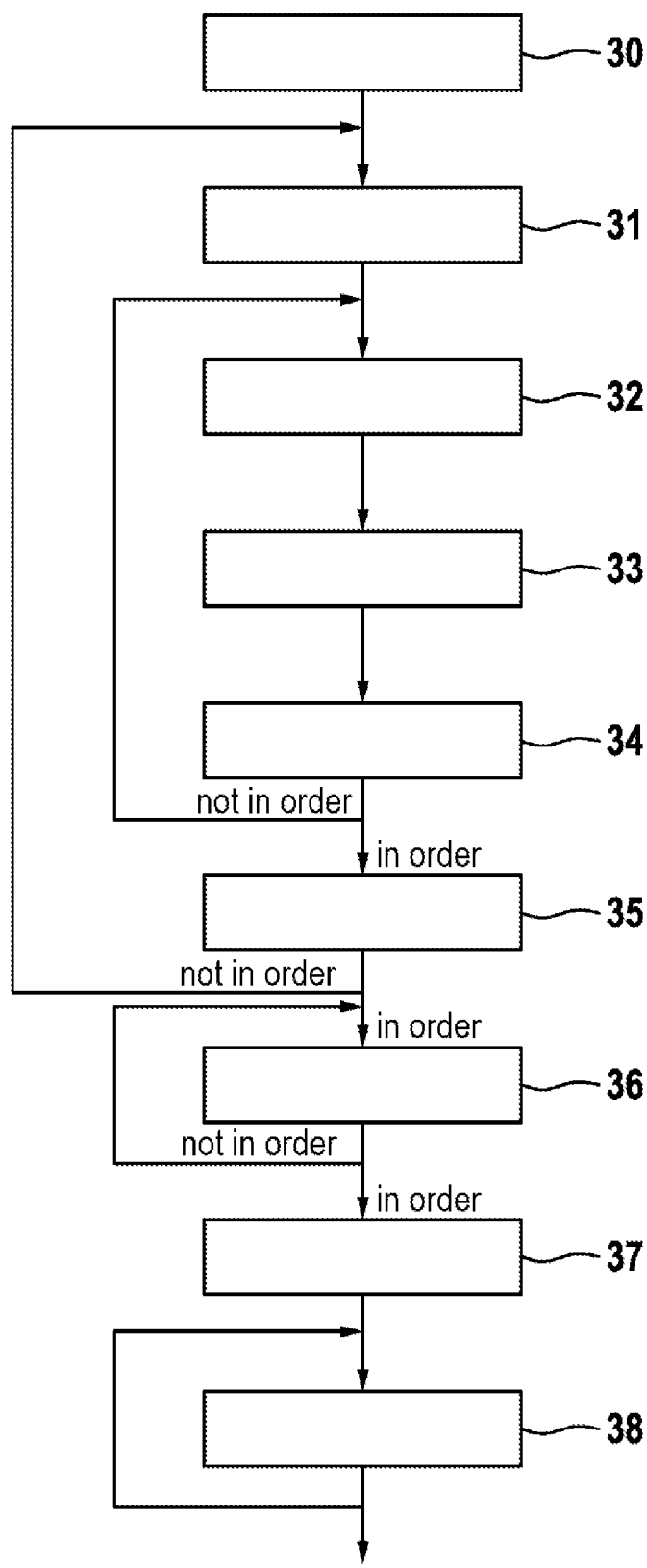
FIG. 6 shows a schematic illustration of a sequence of a data processing process according to one example embodiment.

A further example embodiment is schematically illustrated based on FIG. 6, according to which in a first step 30, a bending body 1 is modeled, supported on a CAD system. Subsequently, in a second step 31, a component center line is generated, for example according to VDI 3430. For this purpose, items of information on the geometry (for example plate thickness) and/or the material (for example substance) of the bending body 1 can be taken into consideration. In a third step 32, a tool geometry is determined. The kinematic ratio of the bending device 2 or the at least one bending element 3 used in the bending device 2 can be taken into consideration here. Then, in a fourth step 33, an iterative calculation of the movement curve or the intended bending information 18 of the at least one bending element 3 is executed. In a fifth step 34, the producibility is assessed, in this case items of information on the process limits, specifically, on the bending limit, are taken into consideration. I.e., it is checked for plausibility whether the bending body 1 can execute such bending movements at all without cracking, for example. If cracks should result on the bending body 1 in this case, a change of the geometries of at least one bending element 3 can thus be executed, for example, and in this case the check can be executed by running through the third to fifth step 32, 33, 34 once again. If the assessment of the producibility has a positive result, in a sixth step 35, a FEM simulation of the bending process is executed. If this has a negative result, a change of the bending body 1 can be performed, wherein this changed bending body 1 is checked once again beginning with the second step 31. In the case in which the FEM simulation of the bending process (sixth step 35) runs positively, in a seventh step 36, a comparison of the curvature course from an actual quality to an intended quality is carried out. If a non-tolerable difference should occur between the intended curvature course and an actual curvature course, as a result a readjustment of the movement curves and a subsequent further comparison check can be performed. If the comparison of the curvature course is positive, in an eighth step 37, the movement curves are transferred to the bending device 2. After, in a ninth step 38, a bending body 1 has been produced by means of the movement curves or based on the intended bending information 18 on the bending device 2, a compensation of the movement curves or a fine adjustment of the movement curves can be executed if necessary via a comparison of the intended and the actual curvature course. Finally, the method results in an item of intended bending information 18 and thus in a control signal 5 which enables it to produce production-capable bending bodies 1 which are similar to or correspond to a target geometry using the bending device 2.

Figure 7:
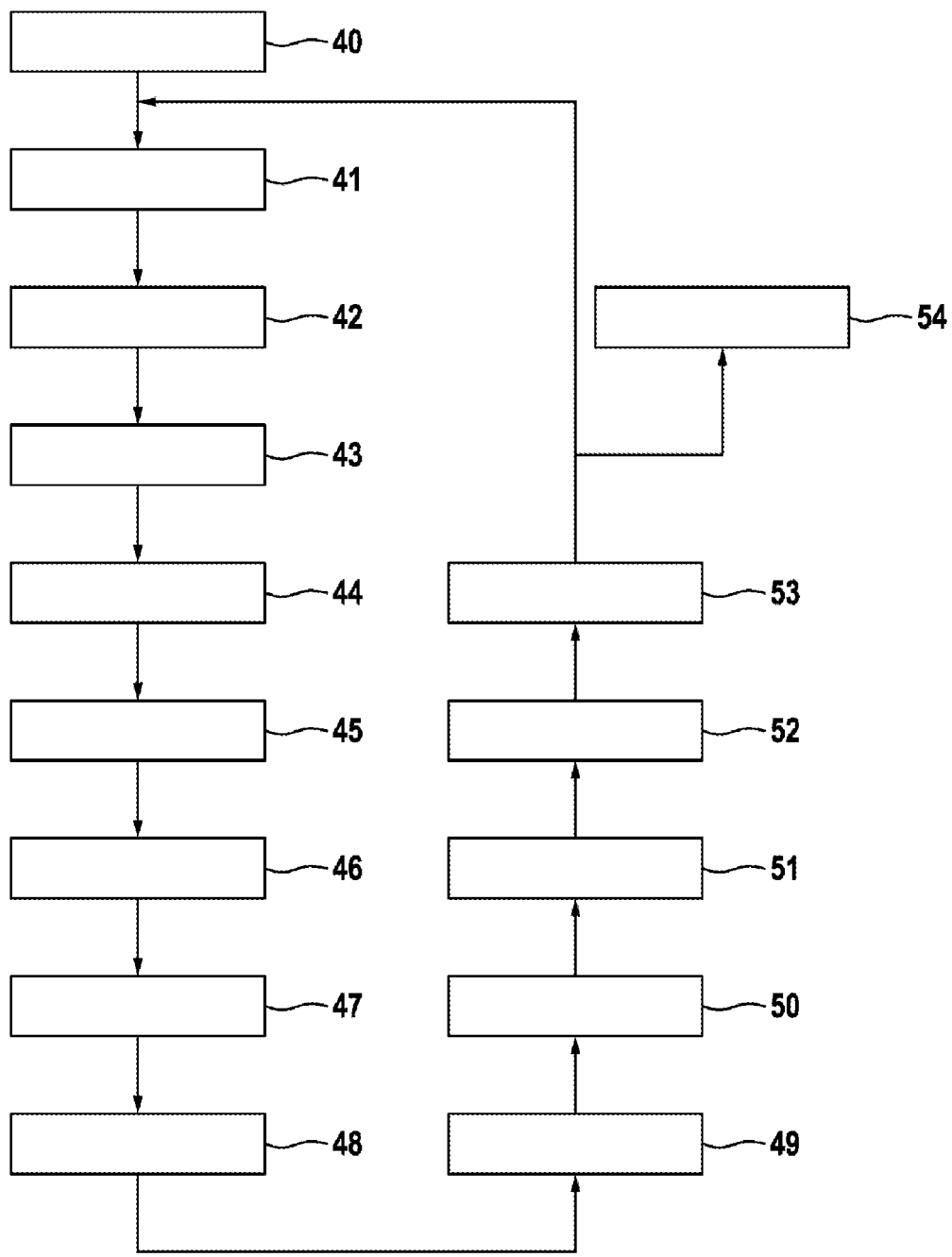
FIG. 7 shows a schematic detailed illustration of substeps of the iterative calculation of the movement curves of the bending device from the data processing process according to FIG. 6.

According to one example embodiment, the iterative calculation of the movement curves and thus the fourth step 33 can run as shown in FIG. 7 with reference to multiple substeps. In a first substep 40, a bending line is imported into a software program. In the following second substep 41, a calculation point i is selected. A transformation of the bending line in a first coordinate system 8 then takes place in a third substep 42. In a fourth substep 43, the position of the bending element 3 is determined, for example, the distance of the bending element 3 to the first coordinate system 8 can be taken into consideration for this purpose. In a subsequent fifth substep 44, a second, local coordinate system 9 is generated or constructed, for this purpose, for example, a support curve 25 supplementing the intended bending information 18 can be imported or modeled. In a sixth substep 45, a torsion angle is determined between the first and second coordinate system 8, 9. The comparison of the first coordinate system 8 to the second coordinate system 9 takes place here. This torsion angle can result, for example, in an optional seventh substep 46 by taking into consideration torsion-specific compensation factors in an item of intended bending information 18 having a compensated profile torsion. In an eighth substep 47, a further (for example third) pivoted coordinate system is then constructed, wherein this is a function of the torsion angle. After the further pivoted coordinate system has been created or modeled, in a ninth substep 48, total distances are determined between the bending element 3 and the further pivoted coordinate system. Finally, in tenth and eleventh substeps 49 and 50, the rotation and translation of the bending element 3 are determined, followed by a calculation executed in a twelfth substep 51 of the ratio of translation and rotation of the bending element 3. Subsequently, in a thirteenth substep 52, a compensation of total distances can optionally take place, an item of correction factor information relating to the translation can be incorporated for this purpose. In a fourteenth substep 53, the compensated translation and the rotation are calculated. The substep sequence beginning with the second substep 41 and ending with the fourteenth substep 53 can be executed iteratively for each point on the bending line to achieve the most continuous possible image to form the intended bending information 18 or the control signal 5. Finally, at least parts of the intended bending information 18 determined in this way or of the control signal 5 determined in this way can be exported via a fifteenth substep 54 as movement curves or intended bending information 18 and thus also as control signal 5 and used by corresponding transmission to an electronic control unit of a bending device for controlling at least one bending element 3 of a bending device 2.

LIST OF REFERENCE NUMERALS 1 bending body
2 bending device
3 bending element
4 bender
5 control signal
6, 6' planar section
7 arrow
8 first coordinate system
9 second coordinate system
10 guide region
11 feed means
12, 12' guide element
13 guide section
14 guide opening
15 arrow
16 bent section
17 data processing process
18 intended bending information
19 arrow
20 first process step
21 acquisition means
22 second process step
23 bending line
24 third process step
25 support curve
26 standardized information
27 batch information
28 online information
30 first step
31 second step
32 third step
33 fourth step
34 fifth step
35 sixth step
36 seventh step
37 eighth step
38 ninth step
39 tenth step
40 first substep
41 second substep
42 third substep
43 fourth substep
44 fifth substep
45 sixth substep
46 seventh substep
47 eighth substep
48 ninth substep
49 tenth substep
50 eleventh substep
51 twelfth substep
52 thirteenth substep
53 fourteenth substep
54 fifteenth substep
55 distance
56 distance

What is claimed is:

1. A method for controlling a bending process for bending a bending body using a bending device comprising a bender and a bending element, the method comprising:
  executing a data processing process comprising:
    describing an item of target geometry of the bent bending body in an intended bending information by comparing at least two coordinate systems; and
  executing a bending process, comprising:
    before and/or during the bending process, controlling the bending element by a control signal based on the intended bending information to bend the bending body using the bending element, wherein
      a first coordinate system of the at least two coordinate systems is arranged on or in a static guide section of the bending device, and
      a second coordinate system of the at least two coordinate systems is arranged:
        on the bending body, or
        in a displacement direction of the bending body in the bending device within an action region of the bending element.

2. The method according to claim 1, wherein the comparison of the at least two coordinate systems takes place with respect to a translational and/or rotational change.

3. The method according to claim 1, wherein a boundary condition information influences the bending process and comprises one or more of the following items:
  an item of material information on a material of the bending body,
  an item of geometry information of the bending body, and/or
  an item of bending device information on the bending device; and
  the intended bending information is deliberately changed based on an item of the boundary condition information.

4. The method according to claim 3, wherein the item of boundary condition information is at least partially acquired by a camera or sensor arranged on the bending device.

5. The method according to claim 3, wherein the item of material information on a material of the bending body comprises:
  at least one chemical and/or physical property specific to a region of the bending body before, during, and/or after the bending process, comprising:
    a density of the bending body,
    a specific heat capacity of the bending body,
    a specific resistance of the bending body,
    a temperature coefficient of the bending body,
    a coefficient of thermal expansion of the bending body,
    a normal melting point of the bending body,
    a permeability of the bending body, a index of refraction of the bending body,
a modulus of elasticity of the bending body, and/or
a shear modulus of the bending body.

6. The method according to claim 3, wherein the geometry information comprises:
the geometrical shape of the bending body before, during, and/or after the bending process, comprising:
a wall thickness of the bending body formed at least in sections as a hollow body,
a length and/or width extent of the bending body,
an area extent of the bending body, and/or
a volume extent of the bending body.

7. The method according to claim 3, wherein the bending device information on the bending device comprises one or more of:
an item of aging information relating to an aging of the bending device,
an item of tolerance information relating to a tolerance of at least one movable bending element of the bending device, and/or
an item of temperature information relating to a temperature of the bending element.

8. The method according to claim 1, wherein the intended bending information is changed by an item of correction information, wherein
the correction information is formed based on
an item of finite element method (FEM) information determined by a bending process simulated by a FEM process, and/or
an item of deviation information determined by production of a test bending component by the bending device and a comparison of the test bending component to the target geometry.

9. The method according to claim 1, wherein the bending element is used that is arranged or formed movably in at least one translational and/or rotational degree of freedom relative to a further bending element active in bending for the bending body.

10. The method according to claim 1, wherein the bending device comprises at least two bending elements,
the first bending element executes a movement along at least one first degree of freedom before or during the bending process, and
the second bending element executes a movement along at least one second degree of freedom different from the at least one first degree of freedom before or during the bending process.

11. The method according to claim 1, wherein the bending body is used as a vehicle component installed in a motor vehicle.

12. A control device for controlling the bending element of the bending device for bending a bending profile, which is configured to execute a method according to claim 1.

13. A bending device for bending a bending profile, which is configured to execute a method according to claim 1.

14. A motor vehicle component, produced in a method according to claim 1.

15. A method for controlling a bending process for bending a bending body using a bending device comprising a bender and a bending element, the method comprising:
executing a data processing process comprising:
describing an item of target geometry of the bent bending body in an intended bending information by comparing at least two coordinate systems; and
executing a bending process, comprising:
before and/or during the bending process, controlling the bending element by a control signal based on the intended bending information to bend the bending body using the bending element, wherein
a first coordinate system of the at least two coordinate systems is arranged at a first action region of a first movable bending element of the bending device,
a second coordinate system of the at least two coordinate systems is arranged at a second action region of a second bending element of the bending device, different from the first movable bending element, and
upon movement of the first movable bending element and/or the second bending element, a corresponding movement takes place of the coordinate system assigned to the respective bending element.

* * * * *